Jan. 13, 1959 B. VOSSEN 2,868,413
AUTOMATIC MACHINERY
Filed Dec. 6, 1954 4 Sheets-Sheet 4

INVENTOR
Bernd Vossen
BY
ATTORNEY

United States Patent Office 2,868,413
Patented Jan. 13, 1959

2,868,413

AUTOMATIC MACHINERY

Bernd Vossen, Arlington, Va., assignor to Melpar, Inc., Alexandria, Va., a corporation of New York Application December 6, 1954, Serial No. 473,251

6 Claims. (Cl. 221—9)

The present invention relates generally to automatic machinery, and more particularly to automatic machinery for feeding objects, having a wide diversity of shapes, in sequence, from a plurality of sequentially available magazines to a delivery position.

Briefly describing the present invention, a plurality of vertically extending tubular magazines is provided, the reservoirs being stacked in laterally adjacent positions. Within each reservoir is a plurality of vertically superposed, horizontally extending objects, such as electrical capacitors, electrical resistors, or the like, each of which consists of a body, and two thin wire leads extending in opposite directions from the body.

A wide diversity of bodies may be handled by a machine in accordance with the invention, provided lead lengths are standardized. The objects are hereinafter referred to as components, since the invention relates primarily, but not exclusively, to handling of electrical and electronic components.

The lower end of each of the component reservoirs is supplied with a normally closed closure, which prevents egress of components from the reservoir, until opened. Each closure is associated with a pneumatic actuator, which, when actuated, opens the closure and permits egress of components by gravity feed.

Extending immediately under the closures is a single, endless conveyor belt, composed of two parallel, laterally separated chains of beads. The lateral distance between the bead chains, and the orientation of the reservoirs with respect to the bead chains, are such that the components, when delivered one by one by gravity from any reservoir, each extend from one chain to the other, each lead resting between adjacent beads of one chain and the bodies of the components subsisting between the chains. The fact that the components are supported on the chains by their leads enables handling of components of a wide variety and diversity of shapes and sizes. Use of a pair of laterally separated bead chains as a conveyor for the components, assures that the components will extend precisely perpendicularly of the direction of travel of the conveyor, will be centered laterally of the conveyor, and will retain their positions relative to one another and relative to the conveyor during travel of the conveyor.

Any given point of the conveyor belt travels always in a predetermined vertical plane, following a path which extends horizontally in a forward direction, which then reverses arcuately, and thereafter extends horizontally in a reverse direction. The components, when fed from the magazines to the conveyor are superposed on the bead chains. The components are carried by the chains to the reversal point of the conveyor, and thereafter are conveyed in reverse direction, being then located under the bead chains. To maintain position of the components relative to the bead chains in the latter part of their travel, a solid retainer strip extends in proximity to and exteriorly of the conveyor path, where it reverses arcuately, and under the conveyor path when the latter travels reversely. The components are thus retained in position with respect to the conveyor by the retainer strip, resting on the latter during reverse motion and being then pulled along by the conveyor. The retainer strip terminates about midway of the reverse portion of the travel of the conveyor, and at this point in the travel of each component the component drops by gravity to a transverse delivery chute.

It is desired to open the reservoir closures in sequence, each being opened only after the components in the preceding reservoir have been exhausted from the conveyor. In accordance with the invention a single sensing position is provided for all the reservoirs, which senses when a currently open reservoir has become exhausted, and opens a succeeding reservoir. The sensing mechanism is located adjacent the delivery point of the system, and is electro-mechanical in character. The system automatically and continuously feeds the bead chains, when no components are sensed by the sensing mechanism, and thus automatically provides for feed of the components from the magazine to the sensing mechanism, which includes two electric switches. One of the switches is actuated by single components as they reach the delivery point, and acts to halt the automatic feed of the conveyor belt whenever a component is ready for delivery. Each component delivery is thereafter controlled by a manual switch, the machine acting automatically only to supply components to the ready position. Only if the component sensing device again fails to sense a component is the conveyor again automatically driven rapidly and continuously to again supply a component to the sensing device. When a component is again sensed the conveyor again stops, and must thereafter be advanced step by step in response to manual switch actuation.

A second component sensing switch spans four components, for example, and is actuated only if a gap of at least four components should occur on the bead chain. This switch controls the magazine closures, opening these automatically in sequence in response to successive switch actuation. It is assumed that if, and only if, a gap as extensive as four components is sensed has a current magazine been emptied, and also that the conveyor is then empty between the sensing switch position and the current magazine. When this condition is automatically sensed, a succeeding magazine is opened. The components made available by the succeeding magazine are rapidly and automatically brought to the delivery position, since the first or single-component switch senses no components until a component is ready for delivery, and when the first component of the succeeding magazine is sensed automatic advance of the bead chain ceases and final delivery of components is again controlled one by one.

In order that the conveyor may feed in precise steps of one bead per step a bead sensing switch is provided, and the conveyor advance is accomplished by means of an electromagnetic clutch and brake system. The clutch is actuated in response to a manually actuated switch, which discharges a measured electric charge through the electromagnetic clutch. This charge is slightly greater than is required to feed the bead chain conveyor one step. The bead sensing switch senses when the conveyor has advanced precisely one step, and supplies a measured charge to the brake, which stops conveyor feed. When no component is sensed the brake circuit is disabled, by disabling the circuit of the bead sensing switch, and rapid motion of the conveyor is thus permitted.

In accordance with the description to this point, if the succeeding magazine were empty the cycle of operations of the system would be permanently terminated. To obviate this possibility a time delayed control is provided, which serves to select a succeeding magazine if no components are delivered to the component sensing position at the end of a predetermined time interval following selection of a preceding magazine. If a component is delivered, the time delay device is disabled. Magazines are, therefore, selected in succession, either (1) because components were provided by a preceding magazine and have all been delivered, or (2) because the preceding magazine was empty, as evidenced by the fact that the time delay device had sufficient time to complete its cycle before disablement.

A further time delay device is provided which terminates operation of the system after a time delay equal to that required for the system to cycle through an entire hopper of magazines, if each one is empty.

It is, accordingly, a broad object of the present invention to provide a novel automatic machine, suitable for feeding irregularly shaped objects one by one from a plurality of magazines, to a delivery station, emptying the magazines in succession.

It is a further object of the invention to provide an automatic machine for conveying electrical components supplied with leads, from a magazine to a delivery station, positively retaining the orientation of the components during the entire process of conveyance.

It is another object of the invention to provide a system for conveying objects from a plurality of magazines, emptying the magazines in succession, and sensing the condition of the magazines remotely thereof.

A further object of the invention resides in the provision of a system for operating a conveyor automatically in successive accurately predetermined steps, while objects are on the conveyor, and rapidly and continuously while the conveyor is empty.

Still another object of the invention resides in the provision of a conveyor step feed control circuit, in which the conveyor is transiently coupled with a drive motor in response to discharge of a measured electrical charge, and is braked after a predetermined movement of the conveyor following the transient coupling.

Another object of the invention resides in the provision of a conveyor consisting of a parallel pair of bead chains.

It is a further object of the invention to provide a system for sensing that an empty one of a plurality of magazines has been actuated to provide components to a conveyor belt, and to select a further magazine in response to such sensing.

It is another object of the present invention to provide a system for feeding components from magazines selected in succession, and which automatically selects a succeeding magazine in response to completion of delivery of components provided by a preceding magazine, or in response to failure of that preceding magazine to deliver components, as the case may be.

Another object of the invention resides in the provision of a pneumatic system, electrically controlled, for selectively actuating a plurality of closures.

The above and still further features, objects, and advantages of the invention will become apparent upon consideration of the following detailed description of a specific embodiment of the invention, especially when taken in conjunction with the accompanying drawings, wherein:

Figure 3 is a schematic mechanical and circuit diagram of the system of Figures 1 and 2;

Figure 1:
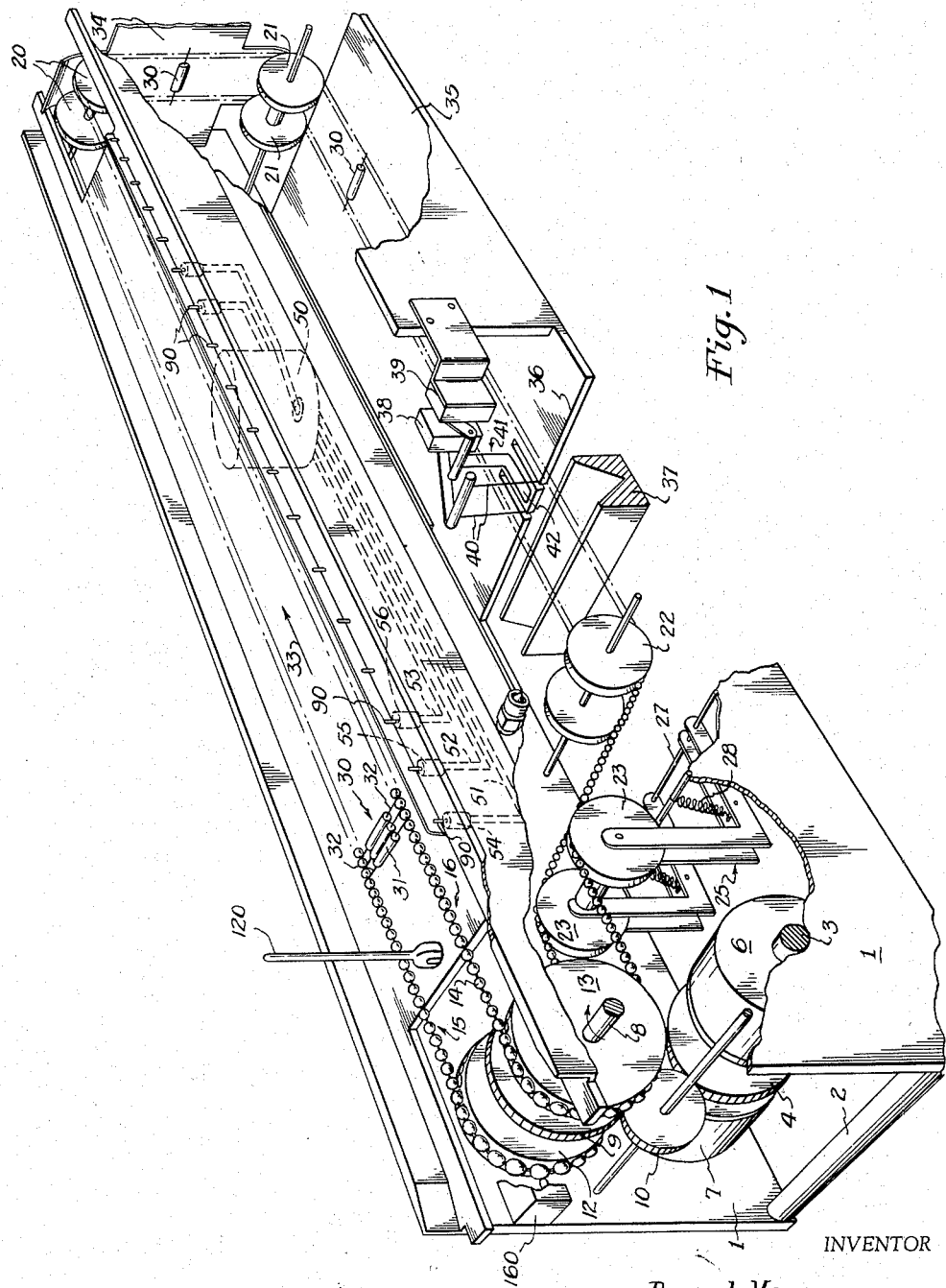
Figure 1 is a view in perspective of a conveyor system, in accordance with the invention.

Referring now more particularly to Figure 1 of the accompanying drawings, the reference numeral 1 denotes a pair of parallel vertical plates, and the reference numeral 2 is a bar spacer therebetween. Extending between the plates 1 is a shaft 3, rotated continuously by means of a motor (not illustrated) and on which is mounted a central drive gear 4, rotatable with respect to shaft 3, and an electromagnetically actuable clutch 6 and brake 7. The clutch 6 and the brake 7 may be selectively coupled with the drive gear 4, when supplied with electric current, selectively to couple the drive gear 4 to shaft 3, and to uncouple same and brake its motion.

Located above the shaft 3, is a further laterally extending shaft 8, to which is secured a drive gear 9, coupled to the drive gear 4 by means of an intermediate gear 10. Secured to the shaft 8 is a pair of disc-like drive elements or sprockets 12 and 13, having circumferential notches suitable for drivingly engaging the beads 14 of a pair of bead chains 15 and 16. The bead chains 15 and 16 extend horizontally to and over a further pair of idler sheaves 20, and therefrom vertically downward and under a further pair of sheaves 21, thence horizontally to a pair of sheaves 22, and thence via spring tensioned idler sheaves 23 to complete their circuit to the sheaves 12 and 13.

In order to maintain tension of the bead chains 15 and 16 the sheaves 23 are mounted each on the ends of a first arm of L-shaped brackets 25, the other arms being pivoted at one end on a cross bar 27, and the first arms being forced toward the bead chains 15 and 16 by tension applied to the second arms by a tension spring 28.

Located on the bead chains 15 and 16 is a plurality of electrical components 30, in the form of cylinders 31, for example only, having each a pair of oppositely extending leads 32, which extend transversely of the bead chains 15 and 16 and are lodged between a pair of adjacent beads. The bead chains 15 and 16 carry the components 30 rearwardly, in the direction of the arrow 33, and over the sheaves 20, and thereafter under the sheave 21. In order to retain the components in driving relation to the bead chains 15 and 16 where the latter are substantially vertical, i. e. between sheaves 20, 21 and beyond sheave 21, a guard strip 34 is located in proximity to the bead chains 15 and 16 and separated therefrom only sufficiently to permit passage of components between the guard strip 34 and the bead chains 15 and 16. After the components have been brought around sheaves 21 they rest on a plate 35, which is parallel to and located under the bead chains 15 and 16, and in sufficiently close proximity thereto that the components remain in register with the bead chains. The plate 35 terminates in an edge 36, located about midway of the length of the bead chains 15 and 16, and extending transversely thereto. Components which have been brought to the edge 36 of plate 35, are deposited by gravity into a transverse feed-channel 37, which constitutes a component delivery point for the system.

Located adjacent the edge 36 of the plate 35 are electrical switches 38 and 39. The switch 38 is actuated by a switch actuator 40, comprising a pair of parallel wires extending into the path of components just about to leave the edge 36 of plate 35 for delivery to transverse feed channel 37. The switch 39 is actuated by a switch actuator 41 having an extensive horizontal actuator plate 42, responsive to passage thereunder of a component 30. The plate 42 extends rearwardly from the edge 36 of plate 35, for a sufficient distance that presence of a component anywhere between that edge and a distance back therefrom equal to four of components 30, will effect actuation.

Secured to a suitable support, intermediate the walls 1, is a solenoid actuated pneumatic distributor 50, which, in response to successive actuating signals, distributes air under pressure, via lines 51, 52, 53 . . . in succession to different ones of pneumatically actuated plungers 54, 55, 56 . . . . Details of the solenoid actuated pneumatic solenoid 50 are illustrated in Figure 5 of the accompanying drawings to which reference is now made.

Figure 5:
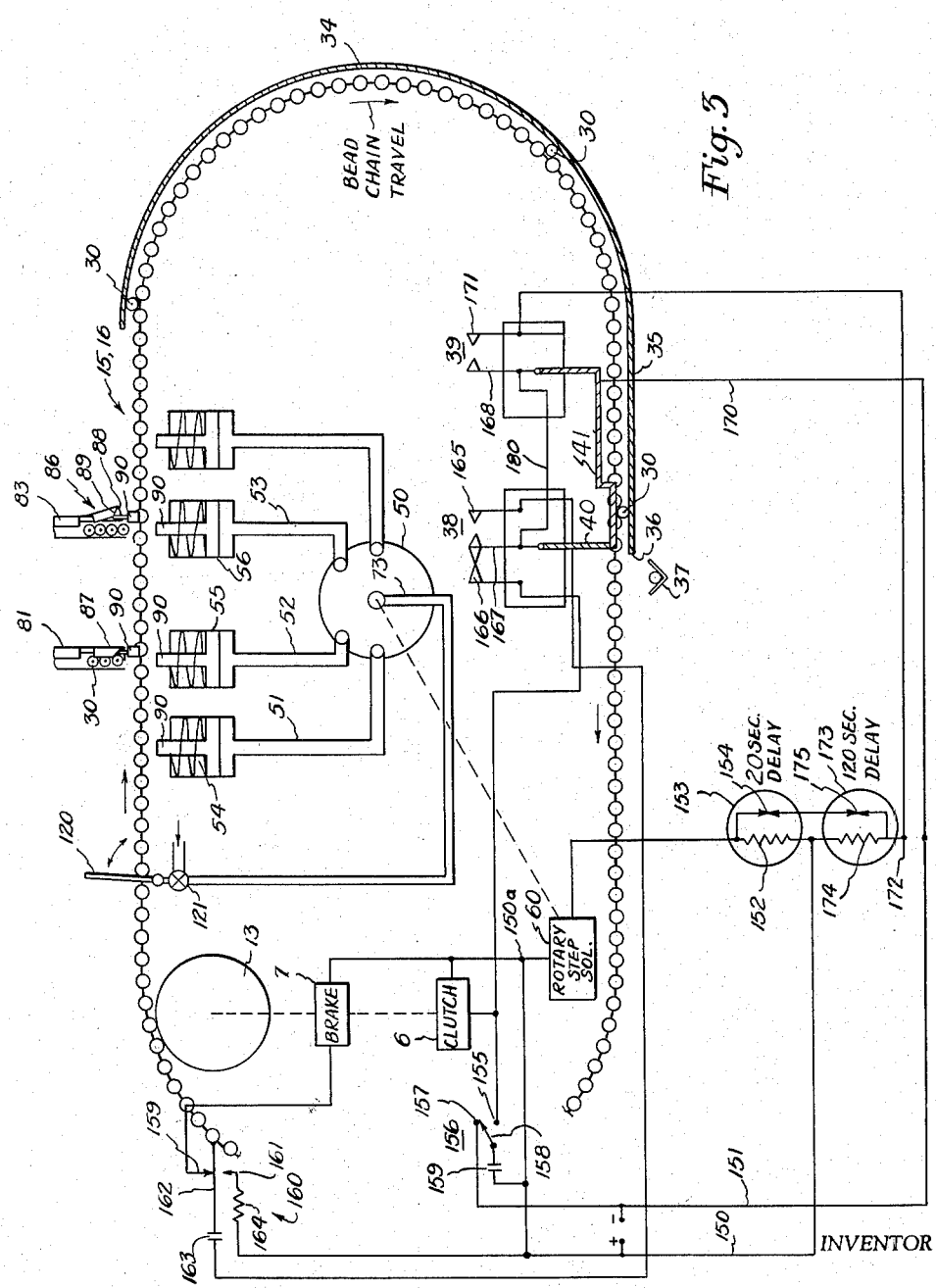
Figure 5 is a view partly in section of a pneumatic commutator valve, and of a step solenoid actuator therefor.
Figure 4:
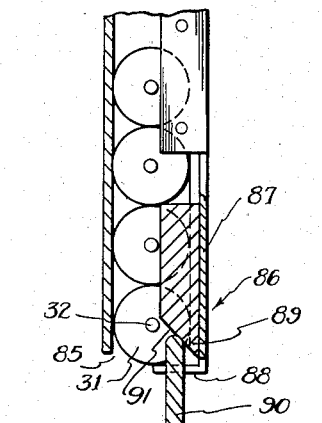
Figure 4 is a view in vertical section taken through a component magazine, and illustrating particularly a closure and closure operator therefor.
Figure 5:
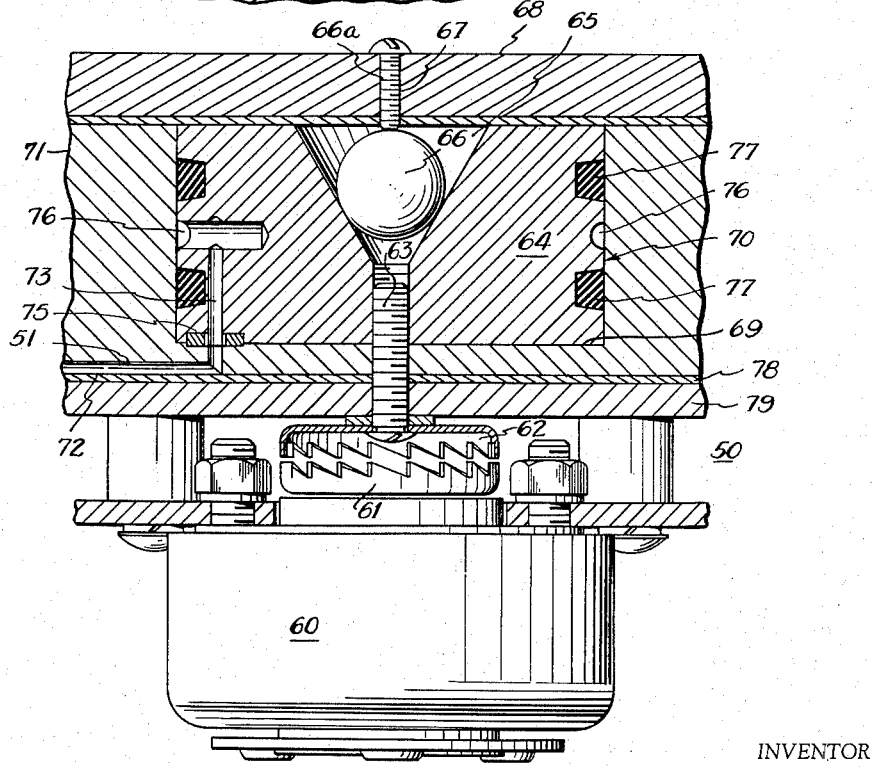

In Figure 5 of the accompanying drawings the reference numeral 60 denotes a rotary solenoid of conventional character per se which, when electrically energized, actuates a driving ratchet element 61 into engagement with a driven ratchet element 62, and rotates the ratchet elements 61, 62 through a predetermined angle. When solenoid 60 is de-energized, the driving ratchet element disengages in readiness for succeeding operation. To the driven ratchet element 62 is secured a bolt 63, which is in turn secured to a cylindrical block 64 constituting a rotary element of a pneumatic distributor. The distributor element 64 is provided with a conical opening 65 extending axially into the element 64, and having its small end lowermost. A metallic ball 66 rests within the openings 65, and is depressed by means of a screw 66a, extending through and threadedly engaging a vertical aperture 67 in a wall 68, extending collinear to the axis of the element 64. Pressure is transmitted from the screw 66a, via the ball 66 to the block 64, which is thereby pressed uniformly and firmly against a flat bottom wall 69 of a cylindrical well 70, within which fits the cylindrical block 64.

A plurality of air channels, as 51, 52, 53 . . . (Figure 1) extend along the under wall 72 of the plate 71, and thence to the wall 69, where they are distributed equidistantly about a circle. At the wall 69 the channels, as 51, may selectively communicate with a single vertical passage 73, in the block 64, selection depending on the angular rotation of element 64 about its axis. The passage 73 communicates with a source of air under pressure. The passages 51, 52, 53 . . . enter the block 64 at points which are equally displaced circumferentially and are so spaced that each step of rotation of block 64, responsive to energization of step solenoid 60, results in communication between passage 73 and a succeeding one of pasages 51, 52, 53 . . . .

In order to seal the transition point between passage 73, and the passages 51, 52, 53 . . . an O-ring 75 is secured to block 64, and surrounds the passage 73. The passage 73, similarly, communicates with an annular passage 76, in block 64, the latter communicating with a source of air under pressure. The annular passage 76 is sealed with respect to the wall 70, by means of rings 77. The passages 51 are fabricated as grooves in the under wall 72 of plate 71, and are sealed off by a gasket 78, backed by a solid plate 79.

Figure 2:
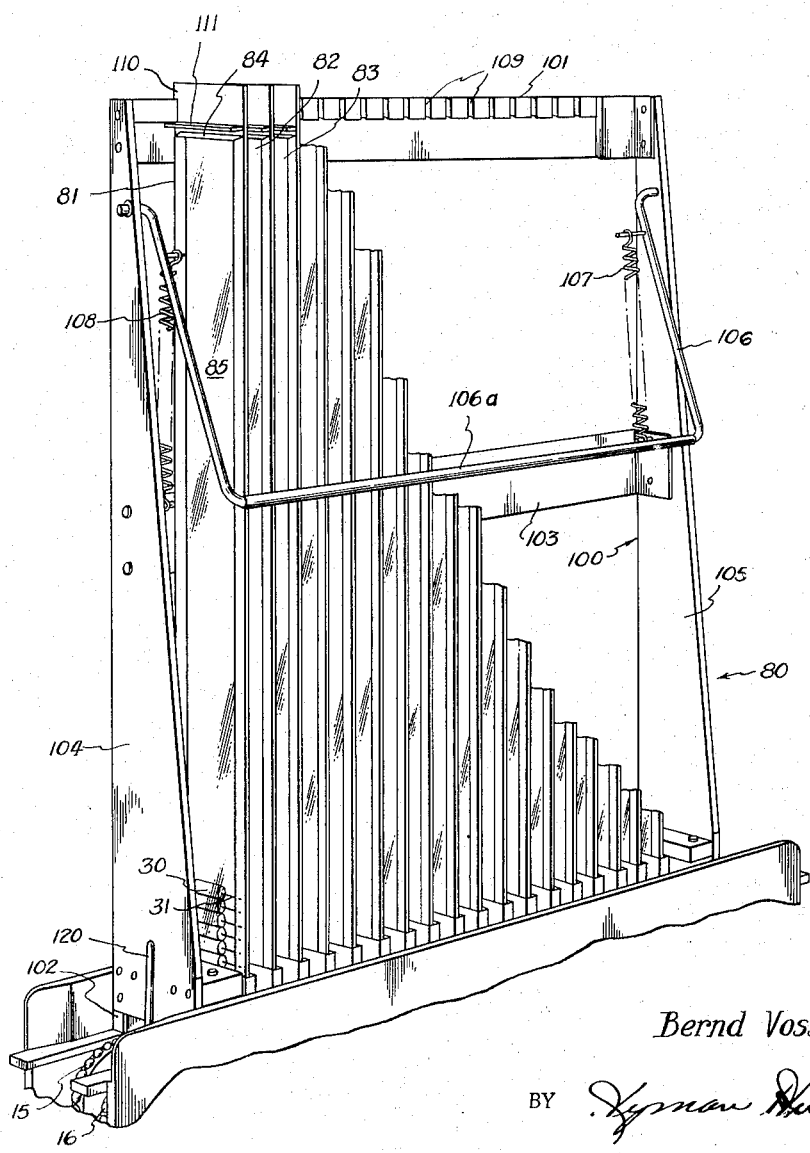
Figure 2 is a view in perspective of a magazine rack which delivers electrical components by gravity to the conveyor system of Figure 1.

Superposed over the bead chains 15 and 16 (see Figure 2) is a storage hopper 80, containing a number of magazines 81, 82, and 83 . . . . The magazines 81, 82, 83 . . . extend vertically from the bead chains 15 and 16 and are constituted of hollow tubes, of rectangular cross-section, having upper ends 84, and at least one transparent vertical wall 85 to permit visual inspection of the contents. The width of the magazines is adequate to contain in superposition the electrical components 30, and their leads 31, and the thickness is only slightly greater than the thickness of the components, to permit free passage of the latter one by one. The lower opening of each magazine is normally blocked by a closure device 86, in the form of a resilient L-shaped strip having one leg, 87, secured to a wall of the magazine, and a further short leg 88 extending under the opening. A camming element 89 is secured to the strip 86, and is so arranged that upward pressure of a pin actuator 90, against the camming surface 91 of the camming element 89, effects lateral displacement of the leg 88, and thus permits egress of components 31 by gravity. The pin actuator 90 is actuated by pneumatic actuators, as 54, 55, 55 . . . , in response to pneumatic pressure in a pneumatic line, as 51, 52, 53 . . . . Accordingly, the magazines may be selected to unload onto the bead chains 15 and 16 in sequence in response to sequential stepping of the pneumatic commutator 50.

The hopper 80 is constituted of an open frame 100, having three horizontally extending vertically superposed side bars 101, 102, 103 against which a vertical edge of each of the magazines 81, 82, 83 . . . lies, and a pair of vertically extending frame elements 104, 105 between which the side bars 101, 102, 103 extend, and to which the latter are secured in any convenient fashion.

The magazines 81, 82, 83 . . . are pressed against the horizontal bars 101, 102, 103 by means of a U-shaped bail 106, the arms of which are pivotally secured to the frame elements 104, 105 and the base 106a of which extends horizontally across hopper 80. The base 106a of the bail 106 is spring biased toward the magazines 81, 82, 83 . . . by a pair of tension springs 107, 108, each secured between a point of an arm of the bail 106 adjacent its pivot point and a suitable point of the hopper 80.

The bars 101, 102, 103 are provided with a number of slots 109, into which extend vertical edges 110 of the magazines 81, 82, 83 . . . , and which serve to establish the positions of the latter within the storage hopper 80, and to align the magazines 81, 82, 83 . . . in parellelism. Similarly, each magazine, as 81, 82, 83, includes a lip 111 adjacent the slots 109, which engages the bar 101 and prevents rise of the magazine in response to actuation by an actuating pin 90.

The magazines 81, 82, 83 . . . may be removed from the hopper 80, by pivoting the bail 106, upwardly through 180°, in which case the tension springs retain the bail in its retracted position.

The rod 120, shown extending vertically in Figures 1 and 3, is a pneumatic valve actuator, having two stable positions, i. e. vertically extending, as illustrated, and horizontally extending. When horizontal, the rod 120 maintains closed a valve 121 in the main air conduit of the system. When raised to vertical position the rod 120 maintains open the valve 121. The rod 120 must be depressed into horizontal attitude while a hopper 80 is being removed from or inserted into the machine, because in its vertical attitude it prevents either insertion or removal. This insures that air will not be available to the pneumatic actuators 54, 55, 56 . . . while the hopper 80 is being inserted or removed, and thereby that the valve actuators 90 will be in unactuated condition, and closures 86 in closed positions. After a hopper has been inserted, the rod 120 may be raised ot supply air to the pneumatic system.

Describing now the electrical circuitry of the present invention, a D. C. voltage supply line comprising leads 150 and 151 is provided. The lead 150 is connected directly to one terminal 150a of rotary step solenoid 60. The other terminal of rotary step solenoid 60 is connected through heater element 152 of a thermal delay device 153, having normally closed contacts 154, back to the line 150. The terminal 150 is also connected in parallel to one terminal of each of magnetic clutch 6, and magnetic brake 7. The other terminal of magnetic clutch 6 is connected to a stationary switch contact 155, of manual switch 156. Switch 156 includes a further stationary contact 157, and a movable switch arm 158. The contact 157 is connected directly to line 151, and the switch arm 158 via a condenser 159 to line 150. The remaining terminal of clutch 6 is connected to switch terminal 155. The remaining terminal of brake 7 is connected to a fixed contact 159 of a bead sensing switch 160, having a further fixed contact 161, and a bead sensing movable switch arm 162. The arm 162 is connected via a condenser 163 to stationary control 165 of component sensing switch 38, which senses presence or absence of a single component at the component delivery point of the system, while the stationary contact 161 is connected via current limiting resistance 164 to line 150. The switch 38 includes a further stationary point 166, and a movable arm 167, actuable by an actuator 40, in response to presence of components at the component unloading position. The movable arm 167 is connected electrically to a movable arm 168 of multiple component sensing switch 39, and thence to a lead 170, which is in turn connected to line 151. The switch 39 includes a stationary contact 171, which is connected to one terminal 172 of a long time delay, thermal switch 173, having thermal element 174 and switch element 175. The terminal switches 153 and 173 are connected in series, the junction of the heater elements 152, 174 returning to lead 150, and the junction of the switch elements 154, 175 being blank. The movable arm 168, of switch 39 is connected to the movable arm 167 of switch 38, via lead 180.

In describing the operation of the present system, it is assumed that a storage hopper 80, including a plurality of magazines 81, 82, 83 . . . has been inserted over the conveyor. Thereby, the valve control rod 120 has been raised, and the main air valve 121 opened, supplying air under pressure to the air line 73. It is assumed that magazine 83 is opened, pneumatic distributor 50 being in suitable position to supply air to pneumatic closure operator line 53, and hence to that closure operator 87 which is associated with magazine 83. The closure for the latter is then, assumed open. However, no components have been conveyed, and accordingly, no components exist in position to be sensed by either of switches 38, 39. As will appear hereinafter, because the sensing switches 38, 39 sense no components the bead chains 14, 15 are automatically and continuously fed until a component is sensed by switches 38, 39, at which time the bead chains 14, 15 stop.

The system is now prepared to feed components from the bead chain to the delivery chute, one by one, each in response to actuation of manual switch arm 158. In its unactuated position, arm 158 contacts contact 157, and connects condenser 159 between lines 150 and 151, so that the condenser acquires a charge. When switch arm 158 is brought into contact with contact 155 the condenser 159 discharges through clutch 6. The discharge is sufficient to advance the bead chain a distance in excess of one bead. However, while the bead is advancing the bead sensing switch operates, its arm 162 contacting contact 161 as arm 162 senses a space between beads, charging the condenser 163 through current limiting resistor 164, and then discharges the condenser 163 through brake 7 as arm 162 senses the peak of a bead and is thereby actuated into contact with contact 159. The bead chain is thus repeatedly stopped after a precisely predetermined travel, each step being precisely equal to the distance between bead peaks. The components 30 are thus fed from the conveyor one by one, each in response to actuation of manual switch 156.

Whenever no component is sensed by the switch 38, contacts 166, 167 are closed and contacts 165, 167 open. Opening of contacts 165, 167 opens the charging circuit for condenser 163, and thus disables the brake 7. Closing of contacts 166, 167 energizes clutch 6, and causes automatic continuous advance of bead chain 16, until a component is again sensed by switch 38.

Should four consecutive spaces on chain 16 be vacant immediately preceding the drop-off point it is assumed that an entire load of components, supplied by one of magazines 81, 82, 83 . . . has been delivered and that no components remain on bead chain 16. This condition is sensed by switch 39, which then closes, completing a circuit from line 150, through rotary step solenoid 60, through contacts 154, 175, to contact 171, and back to line 151, via lead 170. The rotary step solenoid 60, when energized, rotates the pneumatic distributor 50 ahead one step, and selects a further magazine.

In the event that after a predetermined time, twenty seconds for example, following operation of rotary step solenoid 60, no component has been fed to position to be sensed by switch 39, it is an indication that a blank magazine has been selected, and it is necessary again to actuate solenoid 60. The rotary solenoid 60, once energized by closure of switch 39, remains energized until switch 39 is re-opened by a component or until reopened by thermal delay switch 153, having the delay time above referred to. At the end of this period, current flow in heater element 152 has generated sufficient heat to open contacts 154, breaking the circuit to the rotary step solenoid 60. The heater circuit for heater 152, while operative, proceeds from line 150, through heater 152, through contacts 154, 175, through switch 39, now closed, and via lead 170 to line 150. When the circuit of heater 152 is broken, the heater 152 cools, and after an appropriate time the contacts 154 reclose, re-energizing the rotary step solenoid 60, and causing the pneumatic distributor 50 to advance another step, and to select a further magazine. This operation repeats until a filled magazine is found, which supplies components to the bead chain conveyor, and disables switch 39, and breaks the energizing circuit for heater 152.

Thermal delay switch 173 possesses a long delay, i. e. about 120 seconds, for example. If all the magazines of a hopper have been opened in sequence, without supplying components to the bead chain, sufficient time will have elapsed for actuating switch 173. The heater element 174 of the thermal delay switch 173 is supplied with current from line 150, and via contacts 168, 171, lead 170, and line 151. Thermal delay switch 173 is, therefore, energized so long as switch 39 is actuated. When energized for the required time, contacts 175 open, opening the circuit to the rotary step solenoid 60. The circuit is then maintained open, so that the rotary step solenoid can no longer seek a filled magazine, since opening the contacts 175 breaks the circuit which energizes switch 153, and further since the circuit for heater element 174, in contradistinction to the circuit for heater element 152, is not affected by the condition of its own contacts.

If desired, a visual indicator may be operated in response to opening of contacts 175, to indicate to an operator that a further supply of component filled magazines is required.

While I have described and illustrated a specific example of the present invention it will be clear that variations of the specific details of construction may be resorted to without departing from the true spirit of the invention as defined in the appended claims.

What I claim is:

1. In combination, a plurality of magazines, each suitable for containing a plurality of components, a closure for each magazine, said closures arranged when open to permit gravity feed of said components in succession, a pneumatic closure operator for each of said closures, a source of pneumatic pressure, each of said closure operators responsive to said pneumatic pressure for opening one associated closure, a pneumatic distributor for selectively supplying pneumatic fluid under pressure to said closure operators and energizable means for actuating said pneumatic distributor to supply said pneumatic fluid under pressure in succession to said closure operators.

2. The combination in accordance with claim 1, wherein is further provided means for conveying said components from each of said magazines to a delivery position, and means responsive to exhaustion at said delivery position of components supplied by one of said magazines for automatically energizing said energizable means for actuating said pneumatic distributor.

3. The combination in accordance with claim 2, wherein said means responsive to absence of said components is a sensing mechanism for sensing the simultaneous absence of a predetermined plurality of said components at predetermined positions adjacent said delivery position.

4. The combination in accordance with claim 3, wherein is further provided a time delay device, means responsive to absence of said predetermined plurality of said components at said predetermined positions adjacent said delivery position for initiating a timing operation of said time delay device, and means responsive to termination of said timing operation for energizing said energizable means for actuating said pneumatic distributor.

5. In a conveyor system, a plurality of magazines arranged for containing objects in superposed relation, a separate normally closed closure for each of said magazines, a separate pneumatic actuator for opening each of said normally closed magazines, a pneumatic step selector for selecting said pneumatic actuators in succession, a sensing device for sensing the presence or absence of said components at a predetermined location, means responsive to sensing by said sensing device of the absence of said components at said predetermined location for actuating said pneumatic step selector, time controlled means for further actuating said pneumatic step selector after a predetermined time delay, and means responsive to sensing by said sensing device of the absence of said components at said predetermined location for disabling said time controlled means.

6. The combination in accordance with claim 5, wherein said pneumatic step selector includes an electromagnetic actuator, wherein said time controlled means is a thermal time delay switch having a thermal element and normally closed contacts, wherein said means for sensing is a normally closed switch actuable to open position in response to presence of said components at said predetermined location, and means connecting said thermal element, said normally closed contacts and said normally closed switch in a first series circuit, and said electromagnetic actuator, said normally closed contacts and said normally closed switch in a second series circuit, and means for supplying power to each of said series circuits.

References Cited in the file of this patent

UNITED STATES PATENTS

| | | |
|---|---|---|
| 332,672 | Mellette et al. | Dec. 15, 1885 |
| 636,138 | Hatfield | Oct. 31, 1899 |
| 1,355,488 | McKenney | Oct. 12, 1920 |
| 1,857,881 | Scott et al. | May 10, 1932 |
| 2,134,832 | Morrison | Nov. 1, 1938 |
| 2,157,289 | Hall | May 9, 1939 |
| 2,313,814 | Eisler | Mar. 16, 1943 |
| 2,325,165 | Goodwin | July 27, 1943 |
| 2,345,355 | Neal | Mar. 28, 1944 |
| 2,371,956 | Dees | Mar. 20, 1945 |
| 2,441,469 | Cameron | May 11, 1948 |
| 2,637,611 | Tandler et al. | May 5, 1953 |
| 2,652,301 | Skillman et al. | Sept. 15, 1953 |
| 2,680,052 | Delf | June 1, 1954 |
| 2,713,878 | Stahl | July 26, 1955 |

FOREIGN PATENTS

| | | |
|---|---|---|
| 568,299 | Great Britain | Mar. 28, 1945 |
| 827,475 | Germany | Jan. 10, 1952 |